United States Patent

[11] 3,634,196

[72] Inventors Otto Wagner;
Klaus Bauer, both of Wuppertal-Elberfeld;
Wilfried Kaufmann, Wuppertal-Vohwinkel; Erich Rauenbusch; Alfred Arens; Eckard Irion, all of Wuppertal-Elberfeld, all of Germany
[21] Appl. No. 787,197
[22] Filed Dec. 26, 1968
[45] Patented Jan. 11, 1972
[73] Assignee Farbenfabriken Bayer Aktiengesellschaft Leverkusen, Germany
[32] Priority May 6, 1968
[33] Germany
[31] P 17 67 389.1

[54] PROCESS FOR THE SEPARATION OF PYROGENS FROM CRUDE PREPARATIONS OF L-ASPARAGINASE
3 Claims, No Drawings
[52] U.S. Cl.................................................. 195/66 A
[51] Int. Cl................................................... C07g 7/02
[50] Field of Search...................................... 95/66 A

[56] References Cited
UNITED STATES PATENTS
3,340,156  9/1967  Jensen.......................... 195/66
3,440,142  4/1969  Teller........................... 195/66

*Primary Examiner*—Lionel M. Shapiro
*Attorney*—McCarthy, Depaoli, O'Brien & Price ABSTRACT: Crude L-asparaginase is freed of pyrogens by contacting solutions of the same containing weak buffers with diethylaminoethyl dextran gels. The process can be carried out according to batch techniques or in a continuous manner by using a chromatographic column.

PROCESS FOR THE SEPARATION OF PYROGENS FROM CRUDE PREPARATIONS OF L-ASPARAGINASE

BACKGROUND OF THE INVENTION

The present invention is, in general, directed to a process for the removal of pyrogens from L-asparaginase which is contaminated therewith. More specifically, the method involves the separation of the pyrogens by means of certain gels using chromatography, or by batch methods.

DESCRIPTION OF THE PRIOR ART

L-asparaginase, a known enzyme, has recently gained importance as a remedy against tumors which require L-asparagine for their growth and is a recognized antilymphoma agent. However, prior preparations of the L-asparaginase for clinical use have been accompanied by difficulties in their use, due particularly to pyrogenic side effects.

L-asparaginase suitable for chemotherapeutic purposes has been produced from *Escherichia coli* according to the methods described by Campbell et al. (Biochemistry 6, 1967, page 671). However, in the prior art methods the pyrogens of the coli cells are entrained in the final product, thereby detracting from its effectiveness. It is likewise possible that during the purification techniques heretofore practiced, which must take place for the most part in water, contaminants having a pyrogenous effect may get into the L-asparaginase. In spite of many efforts, the prior art has not yet been possible to produce pyrogen-free L-asparaginase. The common methods for the removal of the pyrogen, such as filtration over clarification layers, adsorption methods with hydroxyl apatite, aluminum hydroxide, silicates, and with synthetic resins have not proven to be effective. Even chromatography on dextran gels without ionized groups or on diethylaminoethyl cellulose according to Campbell was in vain.

It has now been found that the pyrogens can be removed from crude L-asparaginase preparations by means of diethylaminoethyl dextran gels (DEAE dextran gel) after dissolving said enzyme in buffers of low ion strength. The process can be carried out according to chromatographic techniques by placing the solution so obtained on a column of the swollen dextran gel which has been equilibrated with the same buffer and fractionating and eluating the L-asparaginase through the rising salt concentration. Alternatively, the solution of L-asparaginase in the buffer can be mixed with the dextran gel according to the batch method, followed by filtering or centrifuging the resulting suspension and eluating the enzyme which is bound to the gel with suitable buffers of higher salt concentration.

For reasons not completely understood, diethylaminoethyl dextran gels are extremely effective in the removal of pyrogens from L-asparaginase.

In carrying out the novel process of this invention according to chromatographic techniques, the crude L-asparaginase is dissolved in a 0.02 M solution of a weak buffer which is preferably ammonium acetate or ammonium formate. Other weak buffers can be also used and slightly higher and slightly lower concentration of the buffer are also acceptable. The buffers are in the neutral or slightly alkaline range for optimum results and a pH of about 7 to 8.5 is particularly effective. The amount of L-asparaginase in the buffer solution should not be too high and preferably 1 to 2 weight percent solutions of the enzyme in the buffer are desired.

The dextran gel is first swollen in the same buffer and equilibrated by repeated changing of the buffer. Thereafter it is filled into chromatography columns, whereby the proportion of the cross section to the height of the bed is 1:3 to 1:30. The enzyme solution is fed to the column, whereby the throughput velocity is 2 to 4 ml./hour and per cm.² cross section of the column. The elution is carried out with increasing salt content of the buffer, best with a linear gradient; it is also possible to increase the concentration of the eluent by steps however. The enzyme is freed from acetate ions at concentration of 0.08 M and higher.

The purification can also be carried out by the batch method in that the enzyme solution is fed to the swollen DEAE dextran gel and the pH is adjusted to 7.5 The enzyme is in this case absorbed by the gel and can after thorough washing of the gel be eluated from salt solutions of suitable concentrations on a suction filter or by means of a centrifuge. The advantage of this method as compared with the column method is that the work can be done simply with large quantities. The disadvantage consists in the less exact separation of impurities and the larger amount of liquid needed for the elution.

The isolation of L-asparaginase in solid form can take place by known methods, as for example freeze-drying, preferably after dialysis or by precipitation with polyethylene glycol or acetone.

By the method of the invention, starting with preparations with about 20 to 100 units per mg., pure preparations with 180 to 220 units per mg. and free from impurities are obtained. These preparations are suited for use in chemotherapy.

EXAMPLE 1

30 grams DEAE dextran gel (diethylaminoethyl dextran gel=DEAE-Sephadex A50$^R$, commercial product of Akteibolaget Pharmacia, Uppsala, Sweden) are treated in the usual way with 0.02 M glycine, 0.02 M ammonium formate buffer equilibrated to pH 7.8 and filled into a column of 3.2 cm. diameter. Height of bed: 90 cm. 500 mg. crude L-asparaginase with 100 units per mg. is dissolved in 50 ml. of the above buffer and charged to the column. Subsequently the enzyme is eluated with a linear gradient of 2 liters of the above buffer to 2 liters 0.02 M glycine, 1 M ammonium formate pH 7.5. The asparaginase containing fractions are combined and freeze dried. Yield: 1.03 grams with 27,800 units=83 percent of the initial activity. The specific activity, of the glycine containing product, calculated on the protein, amounts to 210 units per mg.

Pyrogen test on rabbits: Five rabbits were given 200 units per kg. animal. The average value of the temperature increase amounted to 0.48° C.

The starting substance showed under the same conditions a temperature increase of 1.6° C.

EXAMPLE 2

30 grams DEAE dextran gel are pretreated in the usual manner, equilibrated with 0.05 M ammonium acetate pH 7.5 and filled into a column of 3.2 cm. diameter. Height of bed: 95 cm. 500 mg. crude L-asparaginase with 39.7 units per mg. are dissolved in 50 ml. 0.05 M ammonium acetate pH 7.5 and charged to the column. The eluation is done with a linear gradient of 2 liters 0.05 M ammonium acetate pH 7.5 to 2 liters 1 M ammonium acetate pH 7.5. The asparaginase containing fractions are combined. Yield: 18,600 units=94 percent of the initial activity. Specific activity 200 units per mg. protein.

Pyrogen test on rabbits: with 300 units per kg. animal, the average value of the temperature rise amounted to 0.4° C.

The starting substance showed with 200 units per kg. animal a temperature rise of 1.6° C.

For comparison a purification experiment with diethylaminoethyl cellulose is noted.

30 grams DEAE cellulose were equilibrated with 0.05 M ammonium acetate pH 7.5 and filled into a column. 500 mg. crude L-asparaginase (34 U/mg.) were dissolved in 50 ml. of the above buffer, charged on the column and eluated with a linear gradient of 1 liter 0.05 ammonium acetate pH 7.5 to 1 liter 0.5 ammonium acetate pH 7.5.

Yield: 14,000 units=82 percent of the activity with 89 units per mg. protein.

Pyrogen test on rabbits: with 200 units per kg. animal, the average value of the temperature rise was 1.0° C.

The starting substance showed a temperature rise of 1.8° C. under the same circumstances.

Other test conditions brought no further removal of the pyrogen from which the superiority of the method of the invention is apparent.

EXAMPLE 3

490 grams DEAE dextran gel were preheated as usual and equilibrated with 0.05 M ammonium acetate pH 7.5 to which merthiolate in a concentration of 20 mg./liter had been added. The suspension was fed into a column of 20 cm. diameter cooled to 4° C. Height of bed: 65 cm. 9.8 grams of a crude asparaginase with 46 units per mg. were dissolved in 880 ml. 0.02 M ammonium acetate pH 7.5 and fed to the column. Eluation with linear gradients of 10 liters 0.05 M ammonium acetate pH 7.5 to 10 liters 0.5 M ammonium acetate pH 7.5. The asparaginase containing fractions were combined.

Yield: 365,000 units=81 percent of the initial amount.

Specific pyrogen test on rabbits. With 200 units per kg. animal, the average value for the temperature rise amounted to 0.33° C.

The starting substance showed a temperature rise of 1.8° C. under the same conditions.

EXAMPLE 4

To 10 grams DEAE dextran gel, equilibrated in 0.05 M ammonium acetate pH 7.5, a solution of 500 mg. L-asparaginase with 39.7 units per mg. in 100 ml. 0.05 M ammonium acetate solution pH 7.5 is added. The charge is stirred for 15 minutes and then removed by suction. The residue is successively eluated with buffers of different ion strength (see table below).

The L-asparaginase parts eluated at low ion strength contain pyrogen, while the portions eluated with stronger buffers are pyrogen free. The yields are to be seen in the table.

| Buffer | Activity, units | Yield, percent | Pyrogenity, $\Delta$T/animal (° C.) |
|---|---|---|---|
| 0.05 M ammonium acetate pH 7.5 | 5,010 | 24 | 1.1 |
| 0.10 M ammonium acetate pH 7.5 | 3,820 | 18 | 1.2 |
| 0.20 M ammonium acetate pH 7.5 | 7,850 | 37 | 0.9 |
| 0.40 M ammonium acetate pH 7.5 | 4,060 | 19 | 0.3 |
| 0.80 M ammonium acetate pH 7.5 | 520 | 2 | 0.3 |

What is claimed is:

1. A process for the separation of pyrogens from crude preparations of L-asparaginase, which comprises dissolving the enzyme in a buffer of low ion strength, contacting the solution with swollen diethylaminoethyl dextran gel equilibrated with said buffer, and eluating the adsorbed L-asparaginase by higher salt concentration.

2. The process as defined in claim 1 wherein the contacting of the enzyme solution is carried out by charging a column of the swollen diethylaminoethyl dextran gel and the enzyme fractionated and eluated by buffers of higher salt concentration.

3. The process as defined in claim 1 wherein the contacting of the enzyme solution is carried out by mixing with the swollen diethylaminoethyl dextran gel, removing the gel from the suspension ad eluating the adsorbed enzyme from the gel with buffers of higher salt concentration.

* * * * *